(12) United States Patent
Yang

(10) Patent No.: US 10,999,346 B1
(45) Date of Patent: May 4, 2021

(54) DYNAMICALLY CHANGING CHARACTERISTICS OF SIMULCAST VIDEO STREAMS IN SELECTIVE FORWARDING UNITS

(71) Applicant: Dialogic Corporation, Montreal (CA)

(72) Inventor: Kyeong Ho Yang, Freehold, NJ (US)

(73) Assignee: Dialogic Corporation, Montreal (CA)

( * ) Notice: Subject to any disclaimer, the term of this patent is extended or adjusted under 35 U.S.C. 154(b) by 0 days.

(21) Appl. No.: 16/734,751

(22) Filed: Jan. 6, 2020

(51) Int. Cl.
*H04L 29/06* (2006.01)
*H04L 12/18* (2006.01)

(52) U.S. Cl.
CPC .......... *H04L 65/80* (2013.01); *H04L 12/1827* (2013.01); *H04L 12/1831* (2013.01); *H04L 12/1895* (2013.01); *H04L 65/403* (2013.01); *H04L 65/607* (2013.01)

(58) Field of Classification Search
CPC ..... H04L 65/80; H04L 65/403; H04L 65/607; H04L 12/1827; H04L 12/1831; H04L 12/1895
USPC ......................................................... 709/231
See application file for complete search history.

(56) References Cited

U.S. PATENT DOCUMENTS

| | | | | |
|---|---|---|---|---|
| 2014/0365620 A1* | 12/2014 | Lindberg | ................. | H04L 67/10 709/219 |
| 2017/0024100 A1* | 1/2017 | Pieper | ..................... | H04L 65/80 |
| 2018/0343292 A1* | 11/2018 | Pujadas | ............... | H04N 21/2387 |
| 2019/0394426 A1* | 12/2019 | Segal | ....................... | G06F 3/167 |
| 2020/0127940 A1* | 4/2020 | Lopez Fernandez | ... | H04L 65/80 |

OTHER PUBLICATIONS

Dynamic association and participant based adaptive streaming in small base station for live video conference on 5G networks. by Frederick Swartz Daniel et al; published on Mar. 24, 2018. (Year: 2018).*

\* cited by examiner

*Primary Examiner* — Frantz B Jean
(74) *Attorney, Agent, or Firm* — Adam R. Stephenson, Ltd.

(57) ABSTRACT

Techniques for dynamically changing characteristics of simulcast video streams in real-time multi-party video conferences. Once a video conference has been established for a plurality of participant devices, each participant device can provide a notification of its supported video communications characteristic(s) for sending simulcast video streams and receiving video streams. Having been provided such notification, the media server can determine video communications setting(s) and/or parameter(s) to be used by each participant device while sending simulcast video streams or receiving video streams based on the supported video communications characteristic(s) of the respective participant devices. In response to changes in conference, system, or network factors, the media server can request one or more of the participant devices to dynamically change the video communications setting(s) and/or parameter(s) used to send simulcast video streams or receive video streams to maintain acceptable levels of QoE at the respective participant devices.

20 Claims, 4 Drawing Sheets

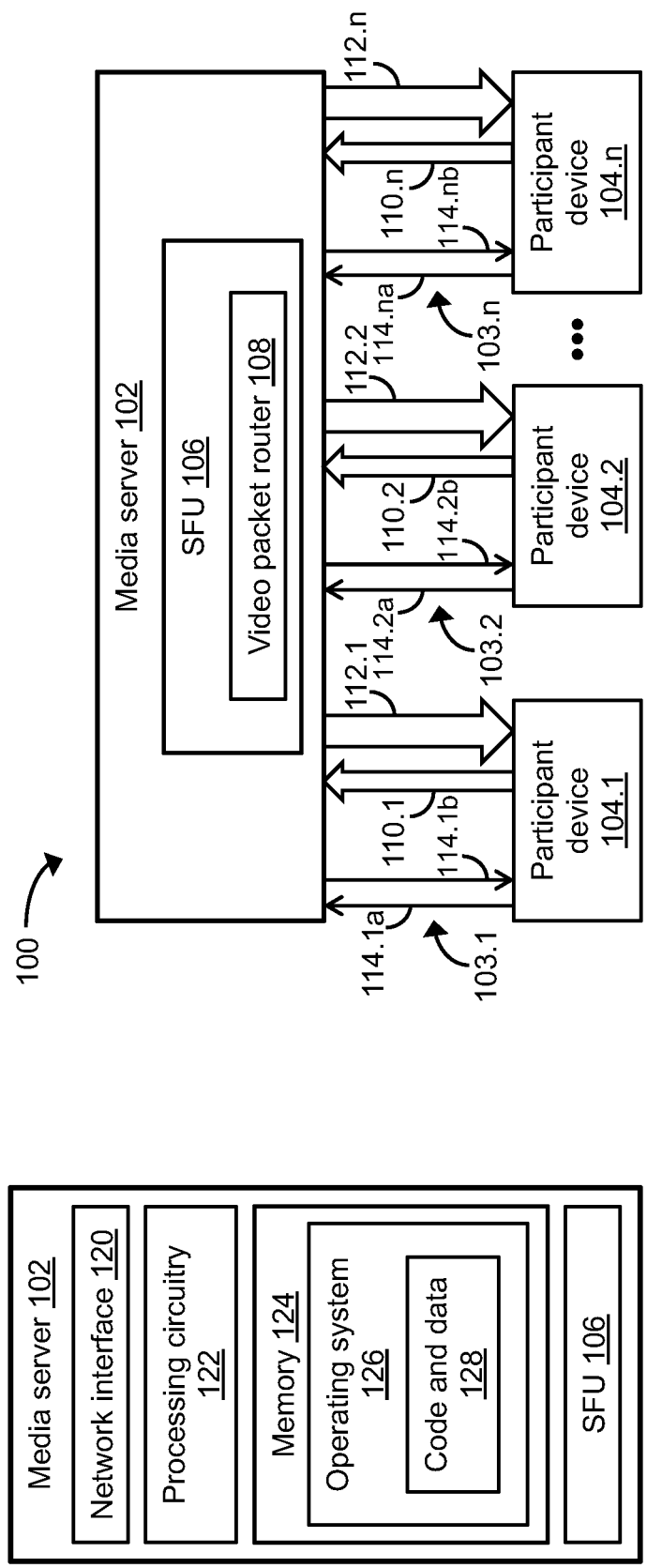

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |V=2|P|  FMT=31 |   PT_MSG=220  |NUM_RID|      length           |
   +-+-+-+-+-+-+-+-+-+-+-+-+-+-+-+-+-+-+-+-+-+-+-+-+-+-+-+-+-+-+-+-+
   |              Identifier of packet sender 202                  |
   +-+-+-+-+-+-+-+-+-+-+-+-+-+-+-+-+-+-+-+-+-+-+-+-+-+-+-+-+-+-+-+-+
   | rid=1 |    PT=96 206  |     H264      |      WIDTH=960 210    |
   |  204  |               |     208       |                       |
   +-+-+-+-+-+-+-+-+-+-+-+-+-+-+-+-+-+-+-+-+-+-+-+-+-+-+-+-+-+-+-+-+
   |   HEIGHT=540 212      | rid=2 |    PT=97 216  |  pause        |
   |                       |  214  |               |       218     |
   +-+-+-+-+-+-+-+-+-+-+-+-+-+-+-+-+-+-+-+-+-+-+-+-+-+-+-+-+-+-+-+-+
   | rid=3 |    PT=98 222  |     VP8       |      WIDTH=640 226    |
   |  220  |               |     224       |                       |
   +-+-+-+-+-+-+-+-+-+-+-+-+-+-+-+-+-+-+-+-+-+-+-+-+-+-+-+-+-+-+-+-+
   |   HEIGHT=360 228      |                   BLANK                |
   +-+-+-+-+-+-+-+-+-+-+-+-+-+-+-+-+-+-+-+-+-+-+-+-+-+-+-+-+-+-+-+-+
```

*Fig. 2*

DYNAMICALLY CHANGING CHARACTERISTICS OF SIMULCAST VIDEO STREAMS IN SELECTIVE FORWARDING UNITS

BACKGROUND

In recent years, video communications have become increasingly popular due to widespread deployment of broadband networks, advancements in video compression technologies, and increased availability of low-cost development tools, such as those conforming to the web real-time communication (WebRTC) standard. Such development tools have been used to implement real-time multi-party video conferencing applications based on the selective forwarding unit (SFU) model. The SFU model allows each of a plurality of participant devices of a video conference to send a video stream to a central server. The central server functions as a packet data router, receiving video streams from the respective participant devices and selectively forwarding or routing a plurality of video streams to each participant device. The SFU model also allows each participant device of a video conference to simultaneously send multiple video streams—including high and low quality video streams—from the same video source to a central server, which selectively forwards or routes the high or low quality video streams to the respective participant devices based on various conference, system, or network factors, such as the conference room layout, the network bandwidth, and the available bit rates of the video streams.

Certain video conferencing applications based on the SFU model have drawbacks, however, in that their video quality and performance typically degrade in video conference environments with a large number of participant devices (e.g., fifty (50) or more), heterogeneous video encoder-decoder (also referred to herein as "codec") types, different ranges of network quality, different levels of packet losses and/or bandwidth, and/or different screen resolutions of the participant devices. It would therefore be desirable to have improved video conferencing applications based on the SFU model that address or mitigate at least some of these video quality and performance drawbacks.

SUMMARY

Systems and methods are disclosed herein for dynamically changing characteristics of simulcast video streams in real-time multi-party video conferences. The disclosed systems and methods can be implemented using a media server communicably connected over a network(s) to one or more participant devices configured to simultaneously send multiple video streams and receive video streams. The media server has a selective forwarding unit (SFU) architecture. In an initial pre-video conference negotiation process, each participant device can provide, with or without a request from the media server, a notification of its supported maximum resolution(s) (e.g., frame size(s), frame rate(s)), video encoder-decoder (also referred to herein as "codec") type(s), and/or other video characteristic(s) for simultaneously sending video streams to the media server, as well as for receiving video streams from the media server (e.g., in an order of preference). Having been provided such notifications of the supported video characteristic(s) from the respective participant devices, the media server can decide or otherwise determine the frame size(s), frame rate(s), video codec type(s), and/or other video setting(s) and/or parameter(s) to be used by each respective participant device while simultaneously sending video streams to the media server and receiving video streams from the media server, based at least on the supported video characteristics of the respective participant devices. In response to changes in the conference room layout, the network bandwidth, the available bit rates of the video streams, and/or other conference, system, or network factor(s), the media server can adapt to such conference, system, or network factor changes by dynamically directing or requesting one, some, or all of the participant devices to change the frame size(s), frame rate(s), video coded type(s), and/or other video setting(s) and/or parameter(s) used to simultaneously send video streams and/or receive video streams. Once the video setting(s) and/or parameter(s) of the participant device(s) have been changed, the media server can receive simulcast video streams with changed video characteristics from the respective participant devices, and forward or route the video streams with the changed video characteristics to the appropriate participant devices of the video conference.

By receiving, at a media server, notifications of supported maximum resolution(s), video codec type(s), and/or other video characteristic(s) from one or more participant devices of a video conference, each of which can be configured to simultaneously send multiple video streams, determining video setting(s) and/or parameter(s) to be used by each respective participant device based at least on the supported video characteristic(s) of the participant device(s), and, in response to changes in the conference room layout, the network bandwidth, the available bit rates of the video streams, and/or other conference, system, or network factor(s), dynamically directing or requesting one, some, or all of the participant devices to change their video setting(s) and/or parameter(s) for simultaneously sending video streams and/or receiving video streams, improved quality of experience (QoE) for participant users of the video conference can (advantageously) be achieved.

In certain aspects, a method of dynamically changing characteristics of video streams in a real-time multi-party video conference includes obtaining, by a media server having an SFU architecture, notifications of supported video characteristics of a plurality of participant devices of the video conference for sending video streams to the media server and receiving video streams from the media server. The method further includes, having obtained the notifications of the supported video characteristics of the plurality of participant devices, determining, by the media server, video settings or parameters to be used by the respective participant devices while sending video streams to the media server and receiving video streams from the media server, based at least on the supported video characteristics of one or more participant devices from among the plurality of participant devices. The method further includes, during the video conference and in response to one or more changes in conference, system, or network factors, dynamically directing, in real-time by the media server, one or more of the plurality of participant devices to change their video settings or parameters to the determined video settings or parameters.

In certain arrangements, the method further includes, during the video conference, determining, in terms of degradation of quality of experience (QoE) at each of the plurality of participant devices, an optimization cost of dynamically directing one or more of the plurality of participant devices to change their video settings or parameters.

In certain arrangements, the supported video characteristics at each of the plurality of participant devices for sending video streams to the media server and receiving video streams from the media server include maximum resolutions for the respective video streams, and each participant device has a corresponding maximum bitrate and bandwidth to the media server. The method further includes determining the maximum resolutions for the respective video streams so that the optimization cost is minimized under a constraint that a sum of bitrates allocated to the respective video streams from each of the plurality of participant devices does not exceed the smaller of the maximum bitrate and the bandwidth from the respective participant device to the media server.

In certain arrangements, the method further includes obtaining the notifications of the supported video characteristics for sending simulcast video streams to the media server and receiving video streams from the media server.

In certain arrangements, the method further includes maintaining, by the media server, a list of the supported video characteristics of the respective participant devices for simultaneously sending video streams or receiving video streams.

In certain arrangements, the method further includes maintaining, by the media server, a video forwarding map to track one or more simulcast video streams being sent from each participant device to the media server for forwarding to the respective participant devices.

In certain arrangements, the changes in conference, system, or network factors include a change indicative of one or more participant devices joining or leaving the video conference, and the method further includes periodically monitoring, by the media server, the video forwarding map, and, while periodically monitoring the video forwarding map, detecting the change indicative of one or more participant devices joining or leaving the video conference.

In certain arrangements, the method further includes, in response to the detecting of the change indicative of one or more participant devices joining or leaving the video conference, updating, by the media server, the list of the supported video characteristics of the respective participant devices of the video conference.

In certain arrangements, the method further includes determining, by the media server, that the updated list of supported video characteristics is different from the list of supported video characteristics prior to being updated, and, during the video conference and in response to the determining that the updated list of supported video characteristics is different from the list of supported video characteristics prior to being updated, determining, in terms of degradation of QoE at each of the plurality of participant devices, an optimization cost of performing one or more of (i) dynamically directing one or more of the participant devices to resume operation of one or more video encoders associated with one or more simulcast video streams, (ii) dynamically directing one or more of the participant devices to pause operation of one or more video encoders associated with one or more simulcast video streams, and (iii) dynamically directing one or more of the participant devices to change their video settings or parameters for sending one or more simulcast video streams.

In certain arrangements, the supported video characteristics for sending video streams to the media server or receiving video streams from the media server include maximum resolutions for the respective simulcast video streams, and each participant device has a corresponding maximum bitrate and bandwidth to the media server. The method further includes determining the maximum resolutions for the respective simulcast video streams so that the optimization cost is minimized under a constraint that a sum of bitrates allocated to the respective simulcast video streams from each respective participant device does not exceed the smaller of the maximum bitrate and the bandwidth from the respective participant device to the media server.

In certain aspects, a media server having an SFU architecture includes a memory, and processing circuitry operative to execute program instructions out of the memory (i) to obtain notifications of supported video characteristics of a plurality of participant devices of the video conference for sending video streams to the media server and receiving video streams from the media server, (ii) having obtained the notifications of the supported video characteristics of the plurality of participant devices, to determine video settings or parameters to be used by the respective participant devices while sending video streams to the media server and receiving video streams from the media server, based at least on the supported video characteristics of one or more participant devices from among the plurality of participant devices, and, (iii) during the video conference and in response to one or more changes in conference, system, or network factors, to dynamically direct, in real-time, one or more of the plurality of participant devices to change their video settings or parameters to the determined video settings or parameters.

In certain aspects, a computer program product includes a set of non-transitory, computer-readable media having instructions that, when executed by processing circuitry of a media server having an SFU architecture, cause the processing circuitry to perform a method of dynamically changing characteristics of video streams in a real-time multi-party video conference. The method includes (i) obtaining notifications of supported video characteristics of a plurality of participant devices of the video conference for sending video streams to the media server and receiving video streams from the media server, (ii) having obtained the notifications of the supported video characteristics of the plurality of participant devices, determining video settings or parameters to be used by the respective participant devices while sending video streams to the media server and receiving video streams from the media server, based at least on the supported video characteristics of one or more participant devices from among the plurality of participant devices, and, (iii) during the video conference and in response to one or more changes in conference, system, or network factors, dynamically directing, in real-time, one or more of the plurality of participant devices to change their video settings or parameters to the determined video settings or parameters.

Other features, functions, and aspects of the claimed invention will be evident from the Detailed Description that follows.

BRIEF DESCRIPTION OF THE DRAWINGS

The foregoing and other objects, features, and advantages will be apparent from the following description of particular embodiments of the claimed invention, as illustrated in the accompanying drawings, in which like reference characters refer to the same parts throughout the different views.

FIG. 1b is a block diagram of the media server of FIG. 1a, in which the media server includes an SFU, a network interface, a memory having an operating system, code, and data, and processing circuitry for executing the code and data out of the memory for dynamically changing the characteristics of simulcast video streams in real-time multi-party video conferences;

FIG. 1c is a block diagram of the system of FIG. 1a, further including bidirectional communication paths disposed between the media server and the participant devices, in which the bidirectional communication paths are configured for receiving, at the media server, notifications of supported video characteristics from the respective participant devices, as well as for sending dynamic directives or requests from the media server to the respective participant devices to change video settings and/or parameters used to simultaneously send video streams to the media server;

FIG. 2 is a diagram of an exemplary format of a request message that the media server can send to a participant device over a communication path to dynamically add or remove simulcast video streams and/or change the video characteristics of any simulcast video streams in real-time during a video conference.

DETAILED DESCRIPTION

Systems and methods are disclosed herein for dynamically changing characteristics of simulcast video streams in real-time multi-party video conferences. In an initial pre-video conference negotiation process, one or more participant devices can each provide, with or without a request from a media server, a notification of its supported video characteristic(s) for sending video streams and receiving video streams. Having been provided such a notification, the media server, which has a selective forwarding unit (SFU) architecture, can determine video setting(s) and/or parameter(s) to be used by each participant device while sending/receiving video streams, based at least on the supported video characteristic(s) of the participant devices. During the video conference and in response to changes in one or more conference, system, or network factors, the media server can, in real-time, dynamically direct or request one, some, or all of the participant devices to change the video setting(s) and/or parameter(s) used to send/receive the video streams. In this way, improved quality of experience (QoE) for participants of the video conference can be achieved.

Figure 1A:
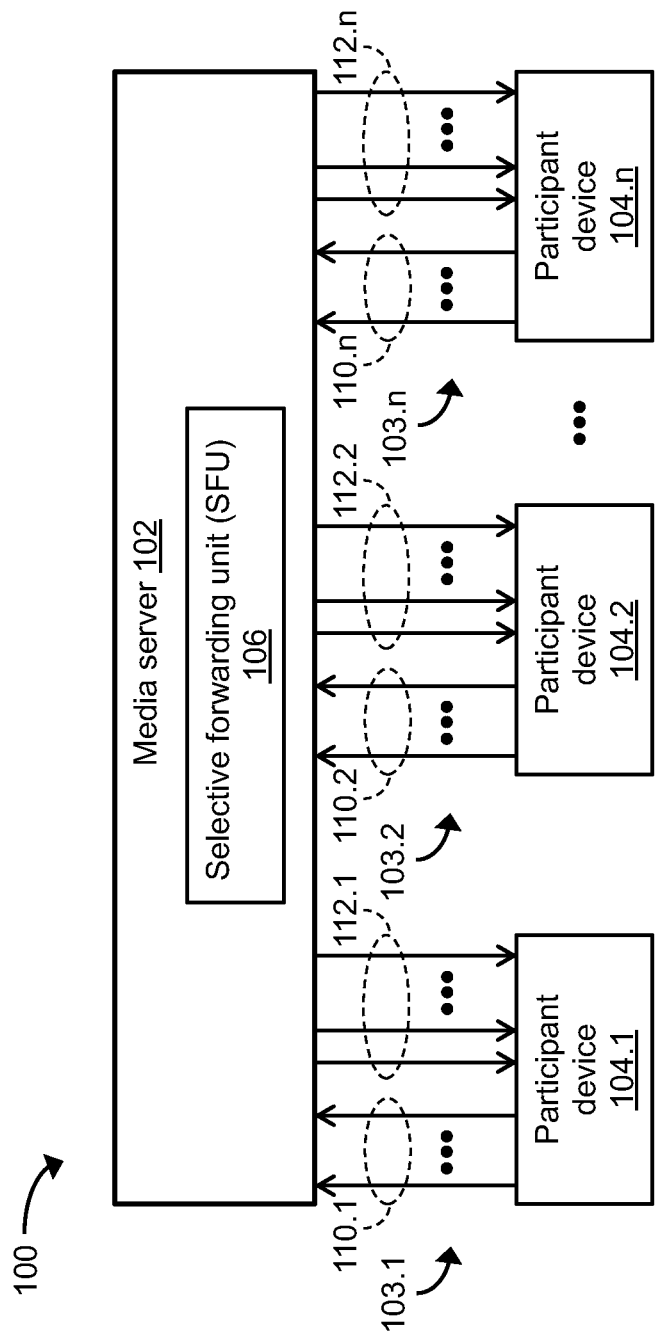
FIG. 1a is a block diagram of an exemplary system for dynamically changing characteristics of simulcast video streams in real-time multi-party video conferences, including a media server having a selective forwarding unit (SFU) architecture communicably connected over a network(s) to one or more participant devices.

FIG. 1a depicts an illustrative embodiment of an exemplary system 100 for dynamically changing characteristics of simulcast video streams in real-time multi-party video conferences. As shown in FIG. 1a, the system 100 can include a media server 102 communicably connected to one or more simulcast-enabled participant devices 104.1, 104.2, . . . , 104.n by one or more communications mediums 103.1, 103.2, . . . , 103.n, respectively. As employed herein, the term "simulcast-enabled participant device(s)" refers to a participant device(s) configured with the capability to simultaneously send multiple video streams. The media server 102 can have an SFU architecture, including an SFU 106. Each of the participant devices 104.1, 104.2, . . . , 104.n can be implemented using any suitable multimedia client and/or server computer or computerized device. The respective communications mediums 103.1, 103.2, . . . , 103.n can be different from one another, and can include one or more wired and/or wireless, public and/or private communications networks (e.g., local area networks (LANs), wide area networks (WANs), intranets, the Internet), communications paths, and/or communications links.

In one embodiment, the web real-time communication (WebRTC) standard can be used to implement a real-time multi-party video conference using the system 100 of FIG. 1a. The WebRTC standard is a set of protocols and application programming interfaces (APIs) that can support browser-to-browser applications, such as video conference applications, video chat applications, voice calling applications, and peer-to-peer (P2P) file sharing applications. In an exemplary video conference, each of the participant devices 104.1, . . . , 104.n can be a simulcast-enabled participant device configured to run a WebRTC browser application (e.g., the Microsoft Edge™, Apple Safari™, Google Chrome™, or Mozilla Firefox™ browser application) to send multiple simulcast video streams using the transport control protocol/Internet protocol (TCP/IP), the real-time transport protocol/user datagram protocol (RTP/UDP), or any other suitable protocol for sending video packets to the media server 102. As employed herein, the term "simulcast" refers to an action performed by a video stream sender for simultaneously casting or sending multiple representations of the same video (or media) source. Such video streams that are simulcast from the same video (or media) source can have different resolutions (e.g., different frame sizes, different frame rates), different encoder-decoder ("codec") types (e.g., H.264, VP8), and so on.

With reference to FIG. 1a, the participant device 104.1 can send a set of simulcast video streams 110.1 to the media server 102 over the communications medium 103.1. Likewise, the participant devices 104.2, . . . , 104.n can send sets of simulcast video streams 110.2, . . . , 110.n, respectively, to the media server 102 over the communications mediums 103.2, . . . , 103.n, respectively. The SFU 106 can receive, at a video packet router 108 (see FIG. 1c), the simulcast video streams from the respective participant devices 104.1, . . . , 104.n, and selectively forward or route, by the video packet router 108, a plurality of video streams to each participant device 104.1, . . . , 104.n, as appropriate. With further reference to FIG. 1a, the SFU 106 can selectively forward or route a plurality of video streams 112.1 to the participant device 104.1 over the communications medium 103.1. Likewise, the SFU 106 can selectively forward or route pluralities of video streams 112.2, . . . , 112.n to the participant devices 104.2, . . . , 104.n, respectively, over communications mediums 103.2, . . . , 103.n, respectively.

FIG. 1b depicts a detailed view of the media server 102 of FIG. 1a. As shown in FIG. 1b, the media server 102 includes a network interface 120, processing circuitry 122, a memory 124, and the SFU 106. The network interface 120 can be configured to connect the media server 102 to the communications mediums 103.1, 103.2, . . . , 103.n (see FIG. 1a), enabling bidirectional communications between the media server 102 and the respective participant devices 104.1, 104.2, . . . , 104.n. The memory 124 can be configured to include volatile storage (e.g., dynamic random-access memory (DRAM), static random-access memory (SRAM)), and non-volatile storage (e.g., read-only memory (ROM), flash memory). As shown in FIG. 1b, the memory 124 can be configured to store an operating system 126 and specialized code and data 128, which can include one or more sets of program instructions that direct the processing circuitry 122 to implement the various techniques and/or methods disclosed herein. The processing circuitry 122 can be implemented in a variety of ways, using one or more processors running software code, one or more application specific integrated circuits (ASICs), one or more field programmable gate arrays (FPGAs), one or more discrete components, digital circuits, analog circuits, and so on, or any suitable combination thereof.

During operation, in an initial pre-video conference negotiation process, each of the participant devices 104.1, 104.2, ..., 104.*n* can provide, with or without a request from a media server 102, a notification of its supported maximum resolution(s) (e.g., frame size(s), frame rate(s)), video codec type(s), and/or any other suitable video characteristic(s) for simultaneously sending video streams to the media server 102, as well as for receiving video streams from the media server 102 (e.g., in an order of preference). Such a notification 114.1*a* can be provided by the respective participant device 104.1 to the media server 102, as illustrated in FIG. 1*c*. Likewise, such a notification 114.2*a*, ..., 114.*na* can be provided by each of the participant devices 104.2, ..., 104.*n*, respectively, to the media server 102, as further illustrated in FIG. 1*c*.

Having been provided such notifications of the supported video characteristic(s) from the respective participant devices 104.1, ..., 104.*n*, the media server 102 can decide or otherwise determine the frame size(s), frame rate(s), video codec type(s), and/or any other suitable video setting(s) and/or parameter(s) to be used by each respective participant device 104.1, ..., 104.*n* while sending or receiving video streams to/from the media server 102, based at least on the supported video characteristic(s) of the participant devices. During the video conference and in response to changes in the conference room layout, the network bandwidth, the available bit rates of the video streams, and/or any other suitable conference, system, or network factor(s), the media server 102 can, in real-time, adapt to the conference, system, or network factor changes by dynamically directing or requesting one, some, or all of the participant devices 104.1, ..., 104.*n* to change the frame size(s), frame rate(s), video coded type(s), and/or any other suitable video setting(s) and/or parameter(s) used to send/receive the video streams. Once the video setting(s) and/or parameter(s) of the participant device(s) 104.1, ..., 104.*n* have been changed, the media server 102 can receive simulcast video streams with changed video characteristic(s) from the respective participant devices 104.1, ..., 104.*n*, and forward or route the video streams with the changed video characteristic(s) to the appropriate participant devices 104.1, ..., 104.*n* of the video conference.

The disclosed systems and methods of dynamically changing characteristics of simulcast video streams in real-time multi-party video conferences with be further understood with reference to the following illustrative example and FIGS. 1*c* and 2. In this example, a real-time multi-party video conference is implemented using the system 100 of FIG. 1*c*, including the media server 102, the participant device 104.1, and at least one other participant device, such as the participant device 104.2.

As described herein, in an initial pre-video conference negotiation process, the simulcast-enabled participant devices 104.1, 104.2, ..., 104.*n* can provide, with or without a request from the media server, notifications of their supported maximum resolution(s) (e.g., frame size(s), frame rate(s)), video codec type(s) (e.g., H.264, VP8), and/or any other suitable video characteristic(s) for sending simulcast video streams to the media server 102, as well as for receiving video streams from the media server 102 (e.g., in an order of preference). In this example, the participant device 104.1 can send the notification 114.1*a* of its supported video characteristic(s) for sending simulcast video streams to the media server 102, and receiving video streams from the media server 102, as a session description protocol (SDP) offer, as follows:

s=Participant device 104.1
m=video 49300 RTP/AVP 96 97 98 99
a=rtpmap:96 H264/90000
a=rtpmap:97 H264/90000
a=rtpmap:98 VP8/90000
a=rtpmap:99 VP8/90000
a=fmtp:96 profile-level-id=42c01f;max-fs=3600
a=fmtp:97 profile-level-id=42c00b;max-fs=240
a=fmtp:98 max-fs=3600
a=fmtp:99 max-fs=240
a=imageattr:96 send [x=1280,y=720] recv [x=1280,y=720]
a=imageattr:97 send [x=320,y=180] recv [x=320,y=180]
a=imageattr:98 send [x=1280,y=720] recv [x=1280,y=720]
a=imageattr:99 send [x=320,y=180] recv [x=320,y=180]
a=rid:1 send pt=96
a=rid:2 send pt=97
a=rid:3 recv pt=96
a=rid:4 send pt=98
a=rid:5 send pt=99
a=rid:6 recv pt=98
a=simulcast:send 1;2;4;5 recv 3,6

Table I—SDP Offer

It is noted that the participant device 104.1 can send such an exemplary notification (e.g., an SDP offer; see TABLE I) to the media server 102 using the SDP protocol or any other suitable protocol.

As shown in TABLE I above, the notification 114.1*a* indicates that, for sending simulcast video streams to the media server 102, the participant device 104.1 supports a resolution of up to a maximum of 720p (i.e., 1280×720 pixels) and two (2) video codec types, namely, H.264 (i.e., Advanced Video Coding (AVC)) and VP8. As indicated by the following line of the notification 114.1*a* (see TABLE I):

$$a=\text{simulcast:send 1;2;4;5 recv 3,6}, \qquad (1)$$

the participant device 104.1 negotiates with the media server 102 to send four (4) simulcast video streams identified by RTP stream identifiers ("rid") 1, 2, 4, and 5, respectively, and to receive a video stream identified by rid:3 or rid:6, in the order of preference. It is noted that the participant device 104.1 (as well as any of the other participant devices 104.2, ..., 104.*n*) can negotiate with the media server 102 to send a single video stream or multiple simulcast video streams.

As further indicated by the following lines of the notification 114.1*a* (see TABLE I):

$$a=\text{rid:1 send pt=96} \qquad (2)$$

$$a=\text{rid:2 send pt=97} \qquad (3)$$

$$a=\text{rid:3 recv pt=96} \qquad (4)$$

$$a=\text{rid:4 send pt=98} \qquad (5)$$

$$a=\text{rid:5 send pt=99} \qquad (6)$$

$$a=\text{rid:6 recv pt=98}, \qquad (7)$$

the four (4) simulcast video streams identified by rid:1, rid:2, rid:4, and rid:5 correspond to payload types ("pt") 96, 97, 98, and 99, respectively, and the two (2) video streams identified by rid:3 and rid:6 correspond to pt=96 and pt=98, respectively. Accordingly, as shown in TABLE I, a video stream corresponding to pt=96 has a resolution of up to a maximum of 720p (i.e., 1280×720 pixels) and a video codec type of H.264 (AVC), and a video stream corresponding to pt=97 has a resolution of up to a maximum of one-sixteenth (1/16) 720p (i.e., 320×180 pixels) and a video codec type of H.264 (AVC). As further shown in TABLE I, a video stream corresponding to pt=98 has a resolution of up to a maximum of 720p (i.e., 1280×720 pixels) and a video codec type of VP8, and a video stream corresponding to pt=99 has a resolution of up to a maximum of one-sixteenth (1/16) 720p (i.e., 320×180 pixels) and a video codec type of VP8.

Having received the notification 114.1a (e.g., the SDP offer) from the participant device 104.1, the media server 102 sends an answer 114.1b (e.g., an SDP answer) to the participant device 104.1, as follows:

s=Answer to participant device 104.1
    m=video 49674 RTP/AVP 96 97 98 99
    a=rtpmap:96 H264/90000
    a=rtpmap:97 H264/90000
    a=rtpmap:98 VP8/90000
    a=rtpmap:99 VP8/90000
    a=fmtp:96 profile-level-id=42c01f;max-fs=3600
    a=fmtp:97 profile-level-id=42c00b;max-fs=240
    a=fmtp:98 max-fs=3600
    a=fmtp:99 max-fs=240
    a=imageattr:96 send [x=1280,y=720] recv [x=1280,y=720]
    a=imageattr:97 send [x=320,y=180] recv [x=320,y=180]
    a=imageattr:98 send [x=1280,y=720] recv [x=1280,y=720]
    a=imageattr:99 send [x=320,y=180] recv [x=320,y=180]
    a=rid:1 recv pt=96
    a=rid:2 recv pt=97
    a=rid:3 send pt=96
    a=rid:4 recv pt=98
    a=rid:5 recv pt=99
    a=rid:6 send pt=98
    a=simulcast:recv 1;2;4;5 send 3

Table II—SDP Answer

It is noted that the media server 102 can send such an exemplary answer (e.g., an SDP answer; see TABLE II) to the participant device 104.1 using the SDP protocol or any other suitable protocol.

As shown in TABLE II above, the answer 114.1b includes the following line:

$$a=\text{simulcast:recv } 1;2;4;5 \text{ send } 3, \qquad (8)$$

which directs or requests the participant device 104.1 to send to the media server 102 the four (4) simulcast video streams identified by rid:1, rid:2, rid:4, and rid:5, respectively, and informs the participant device 104.1 that the media server 102 will send to it a video stream(s) identified by rid:3 (i.e., a video stream(s) with video characteristics most preferred by the participant device 104.1, according to its order of preference). It is noted that the video characteristics (e.g., maximum resolutions, video codec types) for simulcast video streams to be sent by the participant device 104.2 (as well as any other participant device(s) of the video conference) can be set or otherwise determined in a similar fashion.

It is further noted that, during the video conference, one or more users of the participant devices 104.1, 104.2, . . . , 104.n can join and/or leave the video conference at any desired time(s). Such users of the participant devices 104.1, 104.2, . . . , 104.n can also select and/or change one or more video streams for viewing on screens of their respective participant devices 104.1, 104.2, . . . , 104.n at any desired time(s). In this example, the media server 102 maintains (e.g., in its memory 124; see FIG. 1b) and periodically monitors (e.g., once every second) a video forwarding map to keep track of the simulcast video streams currently being sent from each participant device 104.1, 104.2, . . . , or 104.n (i.e., each video or media source) of the video conference to the media server 102 for forwarding or routing to the other participant device(s) (i.e., the video or media destination(s)) of the video conference. The media server 102 also maintains and updates a list of the supported video characteristics (e.g., maximum resolution(s), video codec type(s)) of the respective video sources and destinations of the video conference for sending and receiving video streams.

In this example, while periodically monitoring the video forwarding map, the media server 102 detects a change indicative of one or more participant devices joining and/or leaving the video conference. Having detected such a change in the video forwarding map, the media server 102 updates the current list of supported video characteristics of the respective participant devices 104.1, 104.2, . . . , 104.n of the video conference, and compares the updated list of supported video characteristics with the immediately prior list of supported video characteristics. If the media server 102 determines, based on the comparison, that the updated list of supported video characteristics is different from the immediately prior list, then the media server 102 can, in real-time, dynamically direct or request one or more of the video sources to add (e.g., resume) or remove (e.g., pause) one or more of its simulcast video streams. For example, a video source can effectively add a video stream by resuming operation of a video encoder associated with the video stream. Further, a video source can effectively remove a video stream by pausing operation of a video encoder associated with the video stream. The media server 102 can also, in real-time, dynamically direct or request one or more of the video sources to change the video characteristics of one or more of the simulcast video streams being sent by the respective video sources. In this way, the quality of experience (QoE) for the participant users of the video conference can be improved.

In this example, however, before dynamically directing or requesting that simulcast video streams be added (e.g., resumed) or removed (e.g., paused) and/or that the video characteristics of any simulcast video stream(s) be changed, the media server 102 performs, for each video source, a calculation of the cost (also referred to herein as the "optimization cost") of taking such dynamic actions in real-time during the video conference. For example, taking such dynamic actions in real-time may affect the optimization cost, in terms of degradation of the QoE at one or more of the video destinations. In one embodiment, an estimated optimization cost, $C_k$, for a video source, k, can be expressed as a sum of optimization costs pertaining to video destinations, i, that receive video streams, j, sent by the video source, k, as follows:

$$C_k = \Sigma_{i,j} g_i(\text{codec\_type}(j), \text{max\_resolution}(i), \text{max\_resolution}_{sdp}(j), \text{max\_resolution}(j)), \qquad (9)$$

in which "codec_type(j)" corresponds to the codec type (e.g., H.264, VP8) for the video stream, j; "max_resolution(i)" corresponds to the maximum video resolution of the video stream, j, up to which the video destination, i, can receive the video stream, j; "max_resolution$_{sdp}$(j)" corresponds to the maximum video resolution for the video stream, j, as specified in the SDP answer (e.g., TABLE II) sent by the media server 102; and, "max_resolution(j)" corresponds to the maximum video resolution to be set for the video stream, j. In this embodiment, the media server 102 performs such a calculation of the optimization cost, $C_k$, under the constraint that the sum of the bitrates allocated to all of the simulcast video streams, j, does not exceed a maximum bitrate, max_bitrate(k), which is the maximum bitrate up to which the video source, k, can send video streams. As employed herein, the term "bitrate" refers to the number of bits sent per second to transmit a video stream as an RTP stream from a video source. It is noted that such a bitrate can affect the QoE of a participant user(s) at one or more video destinations.

With regard to equation (9) above, "$g_i(\ldots)$" corresponds to a predetermined cost function for the video destination, i, due to a change in the maximum video resolution, max_resolution(j), for the video stream, j. For example, the cost function, $g_i(\ldots)$, may be different for each video destination, i, based on a service level agreement (SLA) between the video destination, i, and a service provider. In equation (9), codec_type(j), max_resolution(i), and max_resolution$_{sdp}$(j) have each been determined in the initial pre-video conference negotiation process, and the cost function, $g_i(\ldots)$, is predetermined for each video destination, i. The calculation of the estimated optimization cost, $C_k$, using equation (9) therefore allows for a determination(s) of an optimal (or near optimal) maximum video resolution(s), max_resolution(j), for one or more of the video streams, j, sent by the video source, k.

With further regard to equation (9) above, such a determination of the optimal (or near optimal) maximum video resolution for the video stream, j, is made so that the estimated optimization cost, $C_k$, is minimized under the constraint that the sum of the bitrates allocated to all of the respective simulcast video streams, j, does not exceed the maximum bitrate, max_bitrate(k), for the video source, k. Under this constraint, as the maximum video resolution, max_resolution(j), for the video stream, j, decreases, the bitrate for the video stream, j, decreases and the estimated optimization cost, $C_k$, for the video source, k, relating to the video stream, j, increases, due to the degradation of the QoE at the video destination, i. At the time the bitrate is allocated to the video stream, j, the maximum video resolution, max_resolution(j), for the video stream, j, is determined so as to obtain an acceptable QoE for a participant user at the video destination, i.

In one embodiment, the maximum video resolution, max_resolution(j), for the video stream, j, can be determined, as follows:

$$\text{max\_resolution}(j) = f(\text{codec\_type}(j), \text{bitrate\_allocated}(j)), \quad (10)$$

in which "codec_type(j)" corresponds to the codec type for the video stream, j; "bitrate_allocated(j)" corresponds to the allocated bitrate for the video stream, j; and, "$f(\ldots)$" corresponds to a predetermined function. It is noted that the calculation of the estimated optimization cost, $C_k$, amounts to solving an optimization problem with the constraint that the sum of the allocated bitrates, bitrate_allocated(j), does not exceed the maximum bitrate, max_bitrate(k), for the video source, k. Such an optimization problem can be solved in an iterative fashion, using a differential equation, or by any other suitable technique. It is further noted that, if the calculated estimated optimization cost, $C_k$, is similar to a corresponding prior calculated optimization cost, $C_k$, then real-time dynamic addition(s) or removal(s) of simulcast video streams and/or change(s) to characteristics of simulcast video streams during the video conference may be deferred to avoid any delay(s) that might result from having to restart, from an intra-coded video frame ("I-frame"), either a paused video stream(s) or a video stream(s) with changed video characteristics at any of the video sources.

In this example, however, it is determined that calculated optimization costs, $C_k$, of taking such dynamic actions in real-time during the video conference would not result in undesirable QoE degradation at any of the respective video destinations. The media server 102 therefore, in real-time, dynamically directs or requests one or more of the video sources to add (e.g., resume) or remove (e.g., pause) one or more of its simulcast video streams, and/or to change the video coding characteristics of one or more of its simulcast video streams, in accordance with the updated list of supported video characteristics of the participant devices 104.1, 104.2, . . . , 104.n. For example, the updated list of supported video characteristics of the participant device 104.1 can indicate that the maximum resolution for the simulcast video stream identified by rid:1 has changed from 720p to nine-sixteenths (9/16) of 720p or 540p. Further, the updated list of video characteristics can indicate that the maximum resolution for the simulcast video stream identified by rid:3 has changed from 720p to one-fourth (1/4) of 720p or 360p. The updated list of video characteristics can also indicate that none of the participant devices 104.1, 104.2, . . . , 104.n is currently receiving the simulcast video stream identified by rid:2, and therefore the simulcast video stream identified by rid:2 can be removed (e.g., paused) at the participant device 104.1.

FIG. 2 depicts an exemplary format of a request message 200 that the media server 102 can send to the participant device 104.1 for dynamically adding (e.g., resuming) or removing (e.g., pausing) simulcast video streams and/or changing the video characteristics of any simulcast video stream(s) in real-time during the video conference. It is noted that the media server 102 can send such a request (or directive) with the exemplary format depicted in FIG. 2 (or any other suitable format) to any of the other participant devices 104.2, . . . , 104.n of the video conference. As shown in FIG. 2, the request message 200 includes an identifier 202 of the participant device 104.1 (also referred to as the "packet sender;" see FIG. 2). For example, the identifier 202 of the participant device 104.1 (i.e., the packet sender) can include a number of parameters, such as "V=2," "P," "FMT=31," "PT_MSG=220," "NUM_RID," "length," and/or any other suitable parameters for identifying the participant device 104.1.

As described herein, the updated list of supported video characteristics of the participant device 104.1 can indicate that the maximum resolution for a simulcast video stream identified by rid:1 has changed from 720p to 540p. As shown in FIG. 2, the request message 200 includes a number of parameters for making the change in the video characteristics of the simulcast video stream identified by rid:1, namely, "rid=1" 204, "PT=96" 206, "H264" 208, "WIDTH=960" 210, and "HEIGHT=540" 212. Further, the updated list of video characteristics can indicate that the maximum resolution for a simulcast video stream identified by rid:3 has changed from 720p to 360p. As further shown in FIG. 2, the request message 200 includes a number of parameters for making the change in the video characteristics of the simulcast video stream identified by rid:3, namely, "rid=3" 220, "PT=98" 222, "VP8" 224, "WIDTH=640" 226, and "HEIGHT=360" 228. In addition, the updated list of video characteristics can indicate that none of the participant devices 104.1, 104.2, . . . , 104.*n* is currently receiving a simulcast video stream identified by rid:2. As further shown in FIG. 2, the request message 200 includes a number of parameters for removing (e.g., pausing) the simulcast video stream identified by rid:2, namely, "rid=2" 214, "PT=97" 216, and "pause" 218. It is noted that the media server 102 can send any suitable number of requests (like the request message 200; see FIG. 2) to any suitable participant device(s) 104.1, 104.2, . . . , and/or 104.*n* for dynamically adding (e.g., resuming) or removing (e.g., pausing) simulcast video streams, and/or changing the video characteristics (e.g., maximum resolutions, video codec types) of any simulcast video stream(s), in real-time during the video conference.

Having received the request message 200 (see FIG. 2) from the media server 102 (see reference numeral 114.1*b* of FIG. 1*c*), the participant device 104.1 can add, remove, or change the video characteristics of one or more of its simulcast video streams, as requested or directed by the media server 102 via the request message 200. For example, the participant device 104.1 can change the maximum resolution for its simulcast video stream identified by rid:1 from 720p to 540p. Further, the participant device 104.1 can change the maximum resolution for its simulcast video stream identified by rid:3 from 720p to 360p. The participant device 104.1 can also effectively remove its simulcast video stream identified by rid:2 by pausing a video encoder (not shown) associated with generating the simulcast video stream. It is noted that, in this example, any simulcast video stream sent by the participant device 104.1 whose RTP stream identifier ("rid") does not appear in the request message 200 (e.g., rid:5) remains unchanged.

Figure 3:
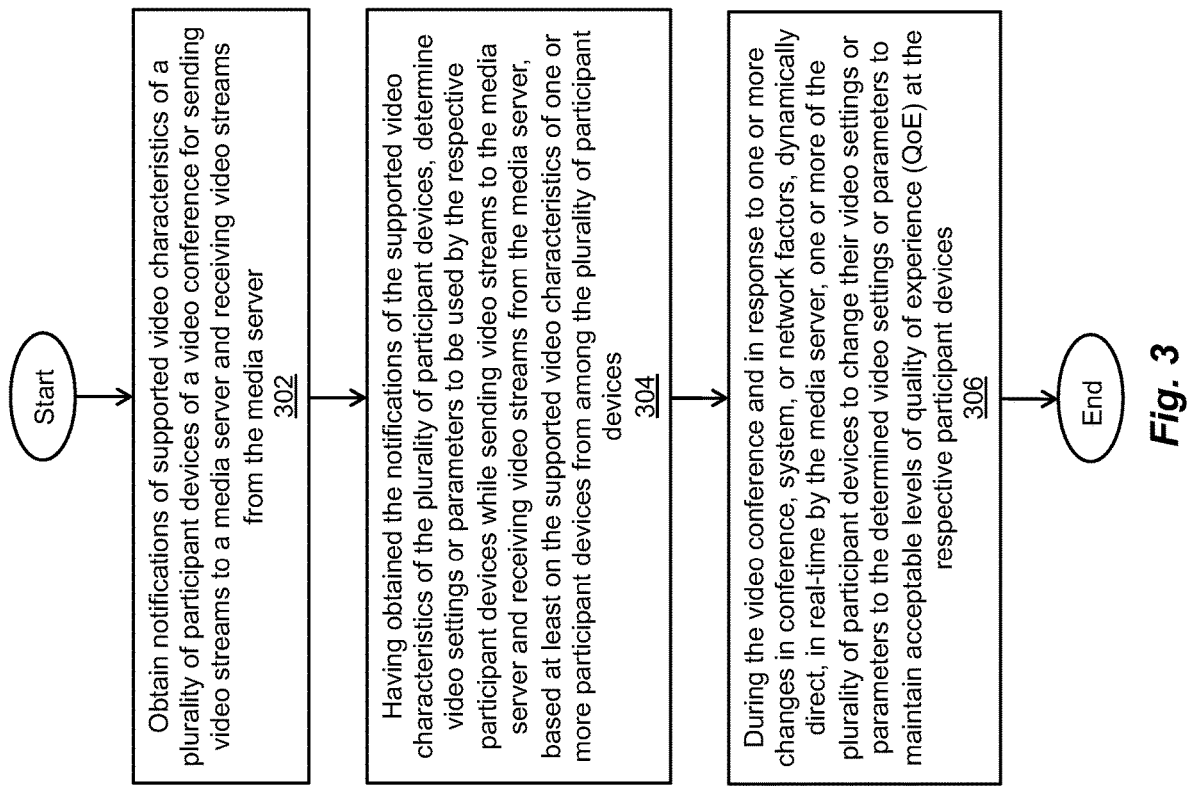
FIG. 3 is a flow diagram of an exemplary method of dynamically changing the characteristics of simulcast video streams in a real-time multi-party video conference using the system of FIG. 1c.

An exemplary method of dynamically changing characteristics of simulcast video streams in a real-time multi-party video conference is described below with reference to FIG. 3. As depicted in block 302, notifications are obtained of supported video characteristics of a plurality of participant devices of the video conference for sending video streams to a media server and receiving video streams from the media server. As depicted in block 304, having obtained the notifications of the supported video characteristics of the plurality of participant devices, video settings or parameters to be used by the respective participant devices while sending video streams to the media server and receiving video streams from the media server are determined, based at least on the supported video characteristics of one or more participant devices from among the plurality of participant devices. As depicted in block 306, during the video conference and in response to one or more changes in conference, system, or network factors, one or more of the plurality of participant devices are dynamically directed, in real-time by the media server, to change their video settings or parameters to the determined video settings or parameters to maintain acceptable levels of quality of experience (QoE) at the respective participant devices.

It is noted that the operations herein described are purely exemplary and imply no particular order. Further, the operations can be used in any sequence when appropriate and can be partially used. With the above illustrative embodiments in mind, it should be understood that the above-described systems, methods, and techniques might employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and/or otherwise manipulated.

Moreover, any of the operations described herein that form part of the above-described systems, methods, and techniques are useful machine operations. The above-described systems, methods, and techniques also relate to a device or an apparatus for performing such operations. The apparatus can be specially constructed for the required purpose, or the apparatus can be a general-purpose computer selectively activated or configured by a software program stored in the computer. In particular, various general-purpose machines employing one or more processors coupled to one or more computer readable media can be used with software programs written in accordance with the teachings herein, or it may be more convenient to construct a more specialized apparatus to perform the required operations.

The above-described systems, methods, and techniques can also be embodied as a computer program product including computer readable code on a computer readable medium. The computer readable medium is any data storage device that can store data, which can thereafter be read by a computer system. Examples of such computer readable media include hard drives, read-only memory (ROM), random-access memory (RAM), CD-ROMs, CD-Rs, CD-RWs, magnetic tapes, and other optical and non-optical data storage devices. The computer readable media can also be distributed over a network-coupled computer system so that the computer readable code is stored and executed in a distributed fashion.

While various embodiments of the invention have been particularly shown and described, it will be understood by those skilled in the art that various changes in form and details may be made therein without departing from the scope of the invention as defined by the appended claims.

What is claimed is:

1. A method of dynamically changing characteristics of video streams in a real-time multi-party video conference, comprising:

obtaining, by a media server having a selective forwarding unit (SFU) architecture, notifications of supported video characteristics of a plurality of participant devices of the video conference for sending video streams to the media server and receiving video streams from the media server;

having obtained the notifications of the supported video characteristics of the plurality of participant devices, determining, by the media server, video settings or parameters to be used by the respective participant devices while sending video streams to the media server and receiving video streams from the media server, based at least on the supported video characteristics of one or more participant devices from among the plurality of participant devices; and during the video conference and in response to one or more changes in conference, system, or network factors, dynamically directing, in real-time by the media server, one or more of the plurality of participant devices to change their video settings or parameters to the determined video settings or parameters.

2. The method of claim 1 further comprising:

during the video conference, determining, in terms of degradation of quality of experience (QoE) at each of the plurality of participant devices, an optimization cost of dynamically directing one or more of the plurality of participant devices to change their video settings or parameters.

3. The method of claim 2 wherein the supported video characteristics at each of the plurality of participant devices for sending video streams to the media server and receiving video streams from the media server include maximum resolutions for the respective video streams, and wherein the method further comprises:
   determining the maximum resolutions for the respective video streams so that the optimization cost is minimized under a constraint that a sum of bitrates allocated to the respective video streams from each of the plurality of participant devices does not exceed a maximum bitrate for the respective participant device.

4. The method of claim 1 wherein the obtaining of the notifications of the supported video characteristics includes obtaining the notifications of the supported video characteristics for simultaneously sending video streams to the media server and receiving video streams from the media server.

5. The method of claim 4 further comprising:
   maintaining, by the media server, a list of the supported video characteristics of the respective participant devices for simultaneously sending video streams or receiving video streams.

6. The method of claim 5 further comprising:
   maintaining, by the media server, a video forwarding map to track one or more simulcast video streams being sent from each participant device to the media server for forwarding to the respective participant devices.

7. The method of claim 6 wherein the changes in conference, system, or network factors include a change indicative of one or more participant devices joining or leaving the video conference, and wherein the method further comprises:
   periodically monitoring, by the media server, the video forwarding map; and
   while periodically monitoring the video forwarding map, detecting the change indicative of one or more participant devices joining or leaving the video conference.

8. The method of claim 7 further comprising:
   in response to the detecting of the change indicative of one or more participant devices joining or leaving the video conference, updating, by the media server, the list of the supported video characteristics of the respective participant devices of the video conference.

9. The method of claim 8 further comprising:
   determining, by the media server, that the updated list of supported video characteristics is different from the list of supported video characteristics prior to being updated; and
   during the video conference and in response to the determining that the updated list of supported video characteristics is different from the list of supported video characteristics prior to being updated, determining, in terms of degradation of QoE at each of the plurality of participant devices, an optimization cost of performing one or more of:
      dynamically directing one or more of the participant devices to resume operation of one or more video encoders associated with one or more simulcast video streams;
      dynamically directing one or more of the participant devices to pause operation of one or more video encoders associated with one or more simulcast video streams; and
      dynamically directing one or more of the participant devices to change their video settings or parameters for sending one or more simulcast video streams.

10. The method of claim 9 wherein the supported video characteristics for sending simulcast video streams include maximum resolutions for the respective simulcast video streams, and wherein the method further comprises:
    determining the maximum resolutions for the respective simulcast video streams so that the optimization cost is minimized under a constraint that a sum of bitrates allocated to the respective simulcast video streams from each of the plurality of participant devices does not exceed a maximum bitrate for the respective participant device.

11. A media server having a selective forwarding unit (SFU) architecture, comprising:
    a memory; and
    processing circuitry operative to execute program instructions out of the memory:
       to obtain notifications of supported video characteristics of a plurality of participant devices of the video conference for sending video streams to the media server and receiving video streams from the media server;
       having obtained the notifications of the supported video characteristics of the plurality of participant devices, to determine video settings or parameters to be used by the respective participant devices while sending video streams to the media server and receiving video streams from the media server, based at least on the supported video characteristics of one or more participant devices from among the plurality of participant devices; and
       during the video conference and in response to one or more changes in conference, system, or network factors, to dynamically direct, in real-time, one or more of the plurality of participant devices to change their video settings or parameters to the determined video settings or parameters.

12. The media server of claim 11 wherein the processing circuitry is further operative to execute the program instructions out of the memory, during the video conference, to determine, in terms of degradation of quality of experience (QoE) at each of the plurality of participant devices, an optimization cost of dynamically directing one or more of the plurality of participant devices to change their video settings or parameters.

13. The media server of claim 12 wherein the supported video characteristics at each of the plurality of participant devices for sending video streams to the media server and receiving video streams from the media server include maximum resolutions for the respective video streams, and wherein the processing circuitry is further operative to execute the program instructions out of the memory to determine the maximum resolutions for the respective video streams so that the optimization cost is minimized under a constraint that a sum of bitrates allocated to the respective video streams from each of the plurality of participant devices does not exceed a maximum bitrate for the respective participant device.

14. A computer program product including a set of non-transitory, computer-readable media having instructions that, when executed by processing circuitry of a media server having a selective forwarding unit (SFU) architecture, cause the processing circuitry to perform a method of dynamically changing characteristics of video streams in a real-time multi-party video conference, wherein the method comprises:
    obtaining notifications of supported video characteristics of a plurality of participant devices of the video conference for sending video streams to the media server and receiving video streams from the media server;

having obtained the notifications of the supported video characteristics of the plurality of participant devices, determining video settings or parameters to be used by the respective participant devices while sending video streams to the media server and receiving video streams from the media server, based at least on the supported video characteristics of one or more participant devices from among the plurality of participant devices; and during the video conference and in response to one or more changes in conference, system, or network factors, dynamically directing, in real-time, one or more of the plurality of participant devices to change their video settings or parameters to the determined video settings or parameters.

15. The computer program product of claim 14 wherein the method further comprises:

during the video conference, determining, in terms of degradation of quality of experience (QoE) at each of the plurality of participant devices, an optimization cost of dynamically directing one or more of the plurality of participant devices to change their video settings or parameters.

16. The computer program product of claim 15 wherein the supported video characteristics at each of the plurality of participant devices for sending video streams to the media server and receiving video streams from the media server include maximum resolutions for the respective video streams, and wherein the method further comprises:

determining the maximum resolutions for the respective video streams so that the optimization cost is minimized under a constraint that a sum of bitrates allocated to the respective video streams from each of the plurality of participant devices does not exceed a maximum bitrate for the respective participant device.

17. The computer program product of claim 14 wherein the obtaining of the notifications of the supported video characteristics includes obtaining the notifications of the supported video characteristics for simultaneously sending video streams to the media server and receiving video streams from the media server.

18. The computer program product of claim 17 wherein the method further comprises detecting a change indicative of one or more participant devices joining or leaving the video conference.

19. The computer program product of claim 18 wherein the method further comprises:

during the video conference and in response to the detecting of the change indicative of one or more participant devices joining or leaving the video conference, determining, in terms of degradation of QoE each of at the plurality of participant devices, an optimization cost of performing one or more of:

dynamically directing one or more of the participant devices to resume operation of one or more video encoders associated with one or more simulcast video streams;

dynamically directing one or more of the participant devices to pause operation of one or more video encoders associated with one or more simulcast video streams; and dynamically directing one or more of the participant devices to change their video settings or parameters for sending one or more simulcast video streams.

20. The computer program product of claim 19 wherein the supported video characteristics for sending or receiving video streams include maximum resolutions for the respective simulcast video streams, and wherein the method further comprises:

determining the maximum resolutions for the respective simulcast video streams so that the optimization cost is minimized under a constraint that a sum of bitrates allocated to the respective simulcast video streams from each of the plurality of participant devices does not exceed a maximum bitrate for the respective participant device.

* * * * *